H. M. TREMBLE.
Corn Planter.
No. 44,758.
Patented Oct. 18, 1864.
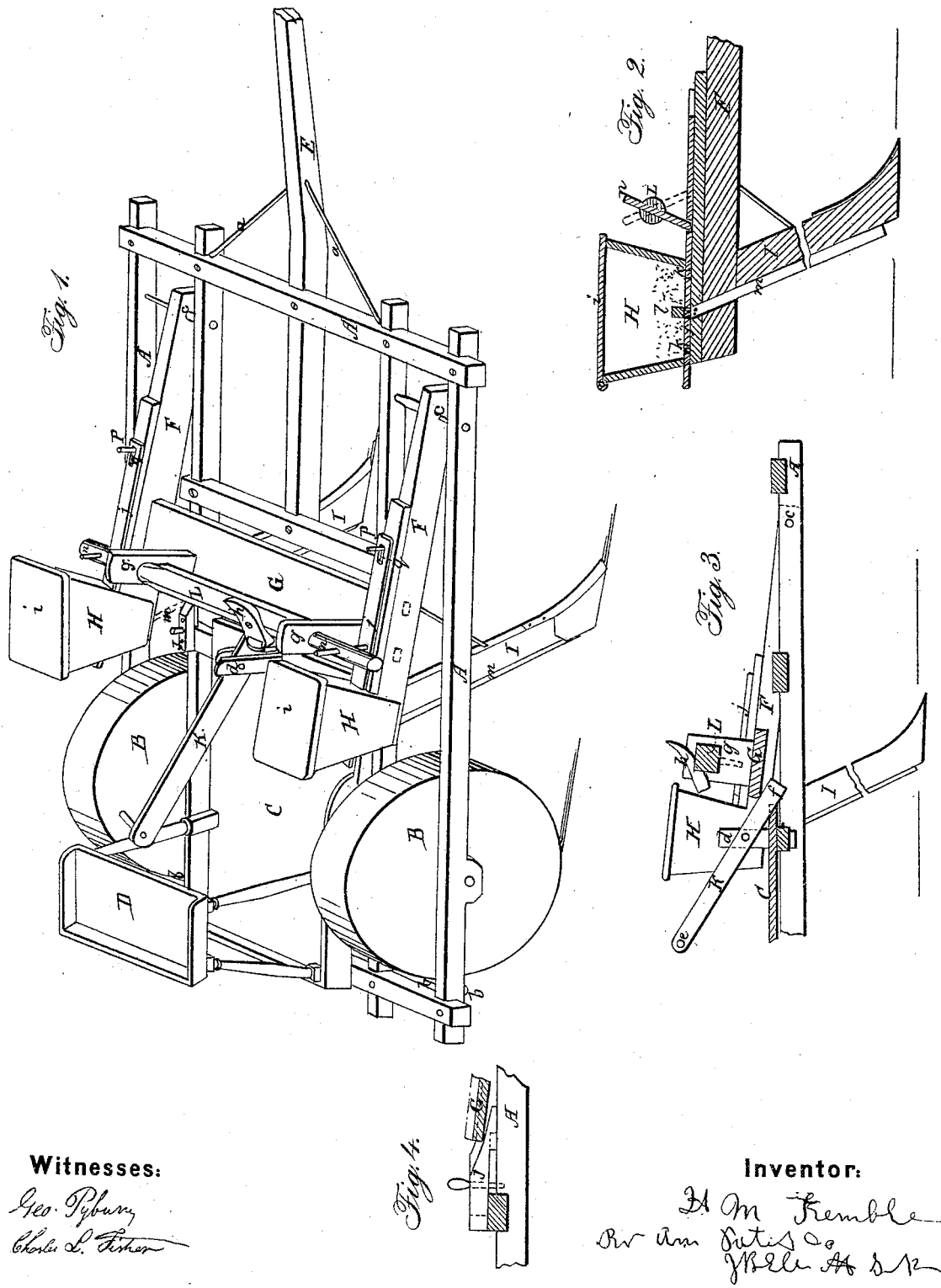
Witnesses:
Geo. Pybury
Charles L. Fisher
Inventor:
H. M. Tremble

UNITED STATES PATENT OFFICE.

HIRAM M. TREMBLE, OF MATTOON, ILLINOIS.

IMPROVEMENT IN SEED-PLANTERS.

Specification forming part of Letters Patent No. 44,758, dated October 18, 1864; antedated November 2, 1861.

*To all whom it may concern:*

Be it known that I, H. M. TREMBLE, of Mattoon, in the county of Coles and State of Illinois, have invented a new and useful Improvement in Seed-Planters; and I hereby declare the following to be a full, clear, and exact description of the same, reference being had to the accompanying drawings and letters of reference marked thereon, which form part of this specification.

My invention consists in the specific arrangement of parts hereinafter described.

In the accompanying drawings, Figure 1 is a perspective view of my planter. Fig. 2 is a vertical section through seed-box, delivery-pipe, and furrowing-plow. Fig. 3 shows the method of raising the whole seeding apparatus from the ground when not required, as in going to and from the field. Fig. 4 shows a device for regulating the depth of the furrow.

Like letters of reference designate like parts in all the drawings.

A A is the frame of the implement.

B B are the traction-wheels, which are made in the form of broad rollers, so as to serve likewise for compressing the earth over the seed when deposited.

C is a platform for the driver, placed between the wheels, on which platform, at the rear, an elevated seat, D, is fixed.

E is the draft beam or pole, strengthened by diagonal stay-rods *a a*. Behind each wheel B is fixed a scraper, *b*, in such a manner that as the wheels revolve any adhering soil is removed from their peripheries.

The seeding apparatus consists of the two lateral pendulum-beams F F, which are pivoted at *c c*, a cross-piece, G, the two seed-boxes H H, and two furrowing-plows, I I, together with accompanying devices for the distribution and deposition of the seed, presently to be described. By means of the wedges J, placed one on each inner longitudinal beam of frame A, on which wedges the cross-piece G rests, as shown in Fig. 4, the furrowing-plows I I may be adjusted to any required depth of furrow, for as the wedges are moved forward the teeth of the plows are raised higher up, and of course make a shallow furrow, and as the wedges are moved backward the teeth of the plows are lowered, and will make a deeper furrow.

K is a lever pivoted between a forked upright, *d*, on platform C, and having at its upper extremity a cross-arm, *e*. The lower extremity, *f*, of this lever passes under the cross-piece G of seeding apparatus. By means of this lever the driver, as he sits on his seat, may throw the seeding apparatus entirely out of action when going to or from the field, or to avoid stumps and the like, for by pressing his left foot on the arm *e* as a treadle the seeding apparatus and plows are raised up out of contact with the earth, the whole apparatus turning on the pivots *c c*.

L is a rocking shaft, supported by uprights *g g* on cross-piece G. Affixed to this rock-shaft is a pedal, *h*, for the right foot of the driver.

Each of the seed-boxes is constructed as follows: H is a box having a sliding cover, *i*. In the bottom of the box is a sliding valve, *j*, having two "bit-holes," *k*, therein, and projecting through the seed-box with a long arm. In the middle of the seed-box, crosswise of the valve and above it, is a scraper, *l*. Immediately below the scraper the conducting-pipe *m* commences, going down behind the arm of furrowing-plow I, and terminating within a short distance of the ground. Through the rocking shaft L (at each end) a pin, *n*, is driven, which pin at one extremity works loosely in a hole or socket in arm of valve *j*. A pin, *p*, which permits the slot *q* in arm of valve *j* to work on it, confines the valve in its place.

The operation of the seed-distributing apparatus is as follows: The boxes H being supplied with seed and the implement put in motion, the driver, with his right foot on the treadle *h*, rocks the shaft L. This, by means of the pin *n*, reciprocates the slide-valve *j*. Seed from the box falls into the holes *k*, which, as they are alternately forced under the scraper *l*, let fall their contents through the conducting-pipe *m* into the furrow prepared by the plow I, as shown in Fig. 2. The earth, then falling over the seed, is presently pressed down by the wheel B.

The sliding valves *j* may be furnished with two projecting wooden pins placed each one a short distance from the bit-holes *k*, which form the seed-cups. These are for the purpose of stirring the seed, and thus securing the filling of said seed-cups.

The platform C, on which the driver's seat is fixed, can be made movable by means of slats and screw-bolts, so as to be readily adjusted to suit the driver's height or length of limbs in relation to pedal, hand-levers, &c.

Having now described my invention, I proceed to state what I claim as new and what I desire to secure by Letters Patent:

The arrangement of pendulum-beams F F, cross-piece G, seed-boxes H H, furrowing-plows I I, rocking shaft L, operating-valves $j\,j$, pedal $h$, pivoted lever K, and wedges J, all substantially as and for the purposes set forth.

H. M. TREMBLE.

Witnesses:
O. P. HARRIS,
M. BISHOP.